US009973515B1

(12) United States Patent
Corbett et al.

(10) Patent No.: US 9,973,515 B1
(45) Date of Patent: May 15, 2018

(54) NETWORK SECURITY FOR AVIONICS WITH ETHERNET CONNECTIONS SYSTEM AND RELATED METHOD

(71) Applicant: Rockwell Collins, Inc., Cedar Rapids, IA (US)

(72) Inventors: Matthew P. Corbett, Mount Vernon, IA (US); Brent J. Nelson, Marion, IA (US); Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days. days.

(21) Appl. No.: 14/173,261

(22) Filed: Feb. 5, 2014

(51) Int. Cl.
*H04L 29/06* (2006.01)

(52) U.S. Cl.
CPC ......... *H04L 63/1408* (2013.01); *H04L 63/12* (2013.01); *H04L 63/123* (2013.01); *H04L 63/126* (2013.01); *H04L 63/14* (2013.01); *H04L 63/1425* (2013.01)

(58) Field of Classification Search
CPC . H04L 63/14; H04L 63/1425; H04L 63/1408; H04L 63/12; H04L 63/123; H04L 63/126; H04L 63/0236; H04W 12/08
See application file for complete search history.

(56) References Cited

U.S. PATENT DOCUMENTS

| | | | | |
|---|---|---|---|---|
| 4,788,531 A * | 11/1988 | Corwin | ................... | H04L 69/40 340/945 |
| 7,155,606 B1 * | 12/2006 | Smith | ..................... | G06F 21/51 380/270 |
| 7,263,609 B1 * | 8/2007 | Wante | ................. | H04L 63/0236 713/154 |
| 2003/0018896 A1 * | 1/2003 | Aoshima | ................. | H04L 63/12 713/181 |
| 2003/0154399 A1 * | 8/2003 | Zuk | ..................... | H04L 63/0254 726/11 |
| 2004/0059909 A1 * | 3/2004 | Le Pennec et al. | .......... | 713/153 |
| 2004/0213237 A1 * | 10/2004 | Yasue | ................. | H04L 63/0227 370/392 |
| 2007/0005986 A1 * | 1/2007 | Bernard | ............. | H04L 63/0853 713/185 |
| 2007/0121939 A1 * | 5/2007 | Olesen et al. | ................ | 380/201 |

(Continued)

*Primary Examiner* — Carl G Colin
*Assistant Examiner* — Vance M Little
(74) *Attorney, Agent, or Firm* — Angel N. Gerdzhikov; Donna P. Suchy; Daniel M. Barbieri (57) ABSTRACT

A system and method is disclosed for identification and response to an unauthorized transmission to a networked critical system. The invention employs a pre-defined parameter which matches trusted sources with defined destinations to enable secure access to the networked critical system. Once the method receives a transmission to the destination, it filters the transmissions based on specific architecture constraints. Should the transmission survive, the method continues with a plurality of layers of system level checks to verify the source matches the pre-defined parameter of a trusted source. Should the transmission fail any of the layers of system level checks, the method provides an appropriate response. Once the transmission survives, the method continuously monitors the data stream for possible threats and allows access the transmission to reach the destination and the networked critical system.

13 Claims, 6 Drawing Sheets

(56) References Cited

U.S. PATENT DOCUMENTS

| | | | |
|---|---|---|---|
| 2007/0143824 A1* | 6/2007 | Shahbazi | 726/1 |
| 2007/0150582 A1* | 6/2007 | Aaron | H04L 63/1408 |
| | | | 709/224 |
| 2007/0198513 A1* | 8/2007 | Stelling | G06F 21/572 |
| 2008/0052517 A1* | 2/2008 | Anstey | H04L 63/10 |
| | | | 713/176 |
| 2013/0208630 A1* | 8/2013 | Bobrek | H04L 67/12 |
| | | | 370/276 |

* cited by examiner

NETWORK SECURITY FOR AVIONICS WITH ETHERNET CONNECTIONS SYSTEM AND RELATED METHOD

FIELD OF THE INVENTION

The present invention relates generally to network security. More particularly, embodiments of the present invention relate to a system and related method for robust protection of a networked critical system via a plurality of layers of protection.

BACKGROUND

Elements of Commercial Off-The-Shelf (COTS) networking systems are emerging as usable elements within current avionics networked systems. The benefits of the COTS capabilities may include high availability, low cost, high bandwidth, well defined and flexible interfaces. These benefits, however, may often be offset or completely overcome by security risks associated with COTS open architecture.

Historically the cost of securing these interfaces has been prohibitive enough to push security functionality onto more costly avionics interfaces. For example, when a traditional COTS interface may be employed, expensive avionics-side elements may be required to increase levels of security to offset the COTS threats. In addition, when some COTS interfaces are provisioned they are constrained with severe operational limitations (e.g., off until a data load operation is active, etc.).

The increased capability and steep cost advantage of COTS elements continues motivation for designers to develop more effective means for managing COTS network security. Therefore, a need remains for a system and related method for robust network security with COTS network elements integrated within a secure network.

SUMMARY

Accordingly, a preferred embodiment of the present invention is directed to a method for identification and response to a transmission to a networked critical system, comprising: receiving at least one pre-defined parameter, the at least one pre-defined parameter associated with a trusted source and a destination, the destination having access to the networked critical system, receiving a transmission from a source, the transmission to the destination, the transmission including at least one data message, analyzing the at least one pre-defined parameter associated with at least one of: a physical source of the transmission, a logical source of the transmission, a physical port of the transmission, a format of the transmission, a payload integrity of the transmission, the payload integrity including a pre-defined integrity, an application level of the transmission, determining if the source is at least one trusted source, the determining based on the analyzing, receiving the transmission at the destination based on the determining, the receiving further including at least one of: monitoring a content integrity of the data message, the content integrity distinct from the pre-defined integrity, the monitoring including a comparison between at least one of: an expected value to the at least one data message and a second data message to the at least one data message, and monitoring at least one parameter associated with a second instance of the hosted application for a difference between the at least one parameter associated with the hosted application, executing a response if the source is not a trusted source based on the determining.

An additional embodiment of the present invention may include a method wherein the at least one pre-defined parameter is associated with an identification of the trusted source and an identification of the destination.

An additional embodiment of the present invention may include a method wherein the networked critical system further comprises an operational control system and an operational feedback system configured for operation of a vehicle.

An additional embodiment of the present invention may include a method further comprising: commanding at least one safety monitor to enable the response action.

An additional embodiment of the present invention may include a method wherein the response action further comprises at least one of: a log entry, an annunciation, a partition reset, a source condemnation, a processor node reset, a Line Replaceable Unit (LRU) reset and a LRU condemnation.

An additional embodiment of the present invention may include a method wherein analyzing the at least one pre-defined parameter associated with the application level of the transmission further comprises a comparison of a known source application with a source application associated with one of: a source Internet Protocol (IP) address and a source User Datagram Protocol (UDP) address.

An additional embodiment of the present invention is directed to a method for identification and response to an unauthorized transmission to a networked critical system, comprising: receiving at least one pre-defined parameter, the at least one pre-defined parameter associated with a trusted source and a destination, the destination having access to the networked critical system, receiving a transmission from a source to the destination associated with the networked critical system, the transmission including at least one data message, filtering the transmission based on at least one of: Media Access Control (MAC) address and Internet Protocol (IP) address, determining a first validity value based on at least one of: a source MAC address and a destination MAC address, the source MAC address associated with the transmission, the destination MAC address associated with at least one destination, determining a second validity value based on at least one of: a source IP address and a destination IP address, the source IP address associated with the transmission, the destination IP address associated with the at least one destination, determining a third validity value based on a port in use by the transmission, determining a fourth validity value based on a format used by the transmission, determining a fifth validity value based on a payload integrity check of the transmission, determining a sixth validity value based on at least one abstraction layer of a networked communications system used by the transmission, enabling a response action based on a comparison of the at least one pre-defined parameter with at least one of: the first, second, third, fourth, fifth, sixth validity values, and further based on an integrity monitor and a cross talk monitor, receiving the transmission within the at least one destination based on a comparison of the at least one pre-defined parameter with at least one of: the first, second, third, fourth, fifth and sixth validity values, the at least one destination having access to the critical networked system.

An additional embodiment of the present invention is directed to a non-transitory computer readable medium having non-transitory computer readable program code embodied therein for identification and response to an unauthorized transmission to a networked critical system, the computer readable program code comprising instructions which, when executed by a computer device or processor, perform and direct the steps of: receiving at least one pre-defined parameter, the at least one pre-defined parameter associated with a trusted source and a destination, the destination having access to the networked critical system, receiving a transmission from a source, the transmission to the destination, the transmission including at least one data message, analyzing the at least one pre-defined parameter associated with at least one of: a physical source of the transmission, a logical source of the transmission, a physical port of the transmission, a format of the transmission, a payload integrity of the transmission, the payload integrity including a pre-defined integrity, an application level of the transmission, determining if the source is at least one trusted source, the determining based on the analyzing, receiving the transmission at the destination based on the determining, the receiving further including at least one of: monitoring a content integrity of the data message, the content integrity distinct from the pre-defined integrity, the monitoring including a comparison between at least one of: an expected value to the at least one data message and a second data message to the at least one data message, and monitoring at least one parameter associated with a second instance of the hosted application for a difference between the at least one parameter associated with the hosted application, executing a response if the source is not a trusted source based on the determining.

An additional embodiment of the present invention is directed to a system for identification and response to an unauthorized transmission to a networked critical system, comprising: a system level check module, the system level check module configured for: receiving at least one pre-defined parameter, the at least one pre-defined parameter associated with a trusted source and a destination, the destination having access to the networked critical system, receiving a transmission from a source, the transmission to the destination, the transmission including at least one data message, analyzing the at least one pre-defined parameter associated with at least one of: a physical source of the transmission, a logical source of the transmission, a physical port of the transmission, a format of the transmission, a payload integrity of the transmission, the payload integrity including a pre-defined integrity, an application level of the transmission, determining if the unknown source is at least one trusted source, the determining based on the analyzing, receiving the transmission within the destination transmission based on the determining, monitoring a content integrity of the data message, the content integrity distinct from the pre-defined integrity, the monitoring including a comparison between at least one of: an expected value and a second data message to the at least one data message, monitoring at least one parameter associated with a second instance of the hosted application for a difference between the at least one parameter associated with the hosted application, and a safety monitor configured for data analysis external to the system level check module, and a response module configured for: receiving an indication from one of: the safety monitor and the system level check module, and providing a response based on the indication.

An additional embodiment of the present invention is directed to a method for identification and response to an unauthorized transmission to a networked critical system, comprising: means for receiving a transmission from a source, the transmission to the destination, the transmission including at least one data message, means for determining if the source is at least one trusted source, means for receiving the transmission within the networked critical system based on the determining, means for executing a response if the source is not a trusted source based on the determining.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention define specific methods for a layered threat mitigation strategy for securing a network by leveraging the capabilities of COTS elements as well as those of avionics hardware and software to 1) apply specific architecture constraints to avoid intrusion; 2) apply system level checks to confirm system integrity; 3) monitor the network connection for intrusion; and 4) provide an immediate response to a detected threat. The methods described herein may be directly applicable to point to point interfaces using a wired Ethernet such as a network conforming to an IEEE 802.3 standard.

In addition, embodiments of the present invention may be configured to function within a network conforming to additional standards such as a Peripheral Component Interconnect Express PCIe bus standard and a Serial Rapid Input Output in-order packet delivery standard.

Embodiments of the present invention provide a low cost approach to enable advanced capabilities of COTS networking technologies while ensuring the overall security of critical systems. In one embodiment, any request for network connection/transmission from an unknown source would be denied. Only transmissions from known sources would be allowed. All allowable network traffic is predefined. As specific critical systems may evolve to include additional COTS components, embodiments of the present invention are vital to maintain critical system integrity while enabling more advanced capabilities similar to those available with personal electronic devices and networked computers.

Within the standard defining 802.3 Ethernet, layers created by network definition may enable embodiments of the present invention to determine a threat to secure network access. Embodiments of the present invention leverage capabilities at each layer which are intrinsic to the hardware and software commercially developed but employed here in a specific manner to control access to critical systems.

Critical systems as used herein may include elements of operational significance, the failure or compromise of which may endanger the lives of operators and others. For example, one critical system onboard an aircraft may include a flight control network including commands to flight control surface movement and primary flight display data available to pilots. Any compromise of the flight control network may cause catastrophic results. One additional example of a critical system in a power generation plant environment may include operational parameters (e.g., temperature, pressure, speed etc.) of a high pressure turbine generator system. Intrusion within the critical systems may produce undesirable results. One goal of embodiments of the present invention may include safe integration of COTS elements into these critical networks.

Specific architecture constraints when accompanied by appropriate system level checks, monitors and responses provide sufficient mitigation to potential network security threats to support the use of commercial Ethernet (specifically 802.3) associated with critical systems.

Figure 1:
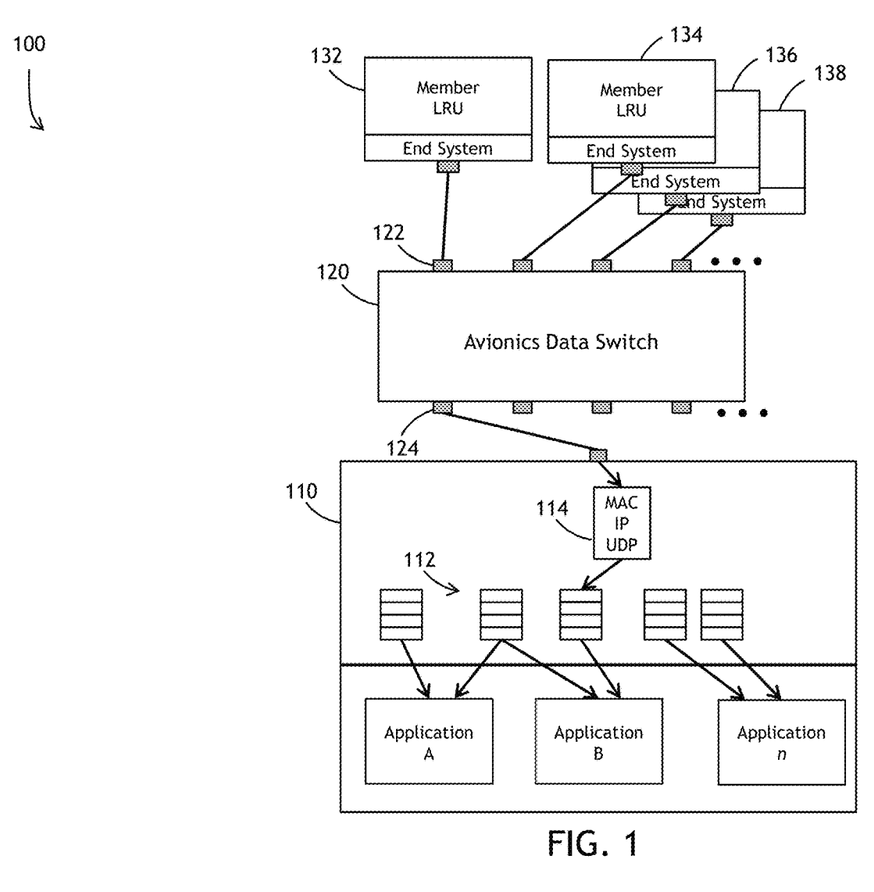
FIG. 1 is a block diagram of one avionics network topology indicating issues addressed by an embodiment of the present invention.

Referring to FIG. 1, a block diagram of one avionics network topology indicating issues addressed by an embodiment of the present invention is shown. An avionics system shown may attach member LRU 132, 134, 136, and 138 to an avionics End System 110 without regard to network security of critical systems. Avionics networked systems may disregard dual side source information available to each Virtual Link (VL). Between LRU 132 and avionics data switch 120, a given VL may only be sourced by one side/location/Virtual Machine (VM) via configuration tools.

Avionics data switch 120 may discard data on a VL not configured for the Physical port 122. Avionics data switch 1230 may forward only VLs configured for the output port 124.

End System 110 may pass frames through protocol stack 114 checking against configuration. Data queues 114 may be aligned per a combination of destination User Datagram Protocol (UDP) port number, destination IP address, and destination Media Access Control (MAC) address (VL). Applications A, B, n may read data queues 112 access limited by configuration and host Operating System. However, some avionics data systems may maintain vulnerabilities to external network threats present in source and destination mismatch as well as the physical port of the intruder.

Figure 2:
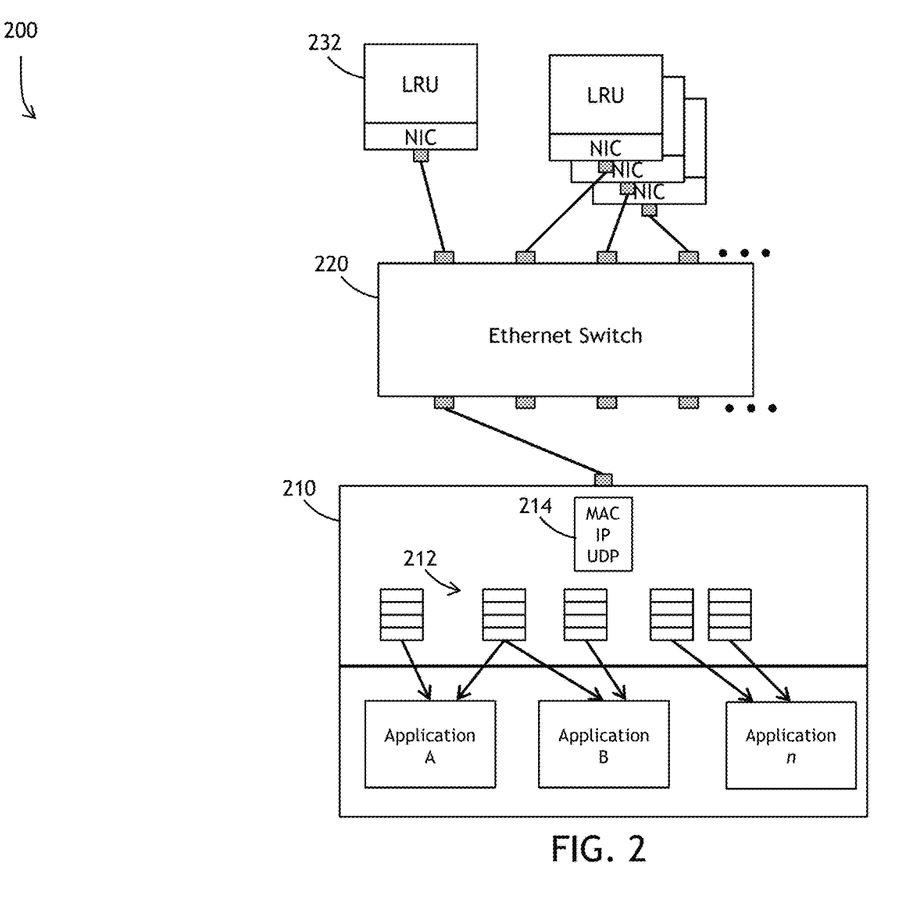
FIG. 2 is a block diagram of diagram of one Ethernet network topology indicating issues addressed by an embodiment of the present invention.

Referring to FIG. 2, a block diagram of diagram of one Ethernet network topology indicating issues addressed by an embodiment of the present invention is shown. An Ethernet network may embrace speed and performance however, vulnerabilities between the Ethernet network and a critical system integrated within the network may be nonexistent.

LRUs 232 may connect with applications via an Ethernet Network Interface Card (NIC). Within the Ethernet switch 220, a given set of data may be sourced by any port into the switch allowing a possible threat access to the switch. Within End system 210 Ethernet protocol stack 214, there is no configuration to specify what data may be allowed or disallowed. Within the data queues 212, data queues may be dynamically created by applications A, B, n and populated via destination UDP port or by destination UDP port and destination Internet Protocol (IP) address. As with the avionics network, the Ethernet network may maintain considerable vulnerabilities.

Figure 3:
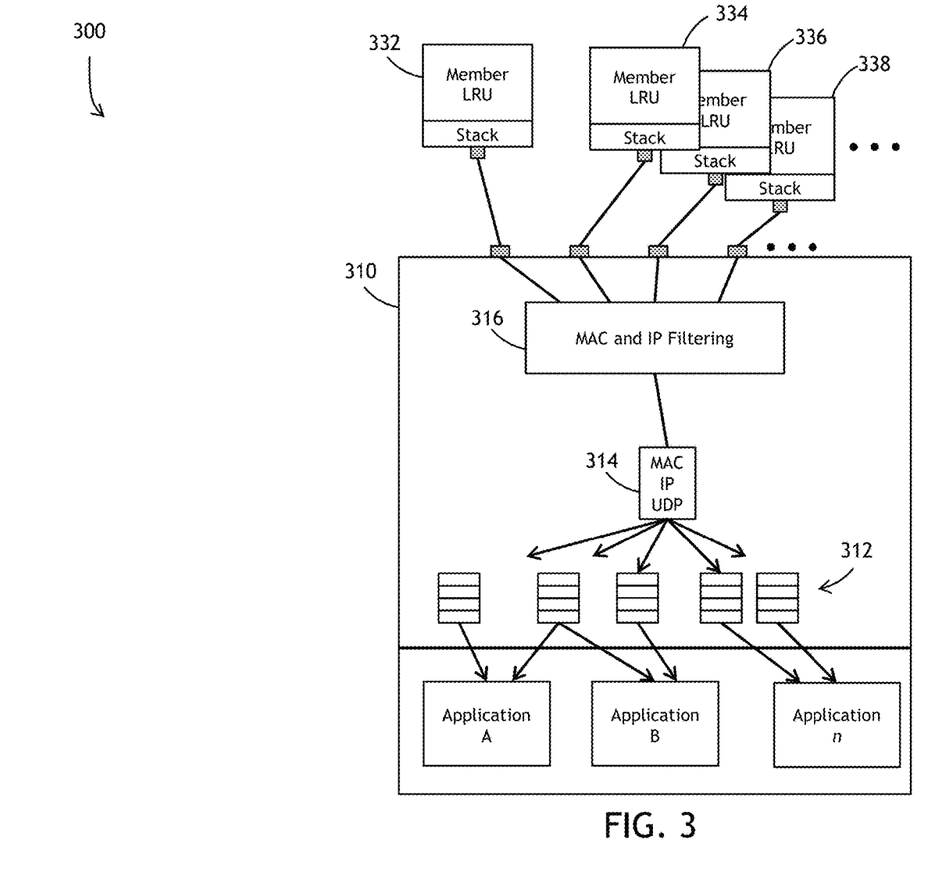
FIG. 3 is a block diagram of a system for network security exemplary of an embodiment of the present invention.

Referring to FIG. 3, a block diagram of a system for network security exemplary of an embodiment of the present invention is shown. Member LRUs 332, 334, 336, and 338 may connect to the preferred network via individual stack interfaces.

Architecture Constraints

One step in the overall protection of the networked critical system may include specific architecture constraints to maintain a secure critical system. In one embodiment, as a transmission enters LRU 310, MAC and IP addresses may be filtered 316 per physical port. This filtering may limit MAC addresses and IP addresses on given port. In addition, once data is routed through protocol stack 314, data queues 312 may form unique combinations of: Destination UDP port number, Destination IP address, source IP address and physical port.

Figure 4:
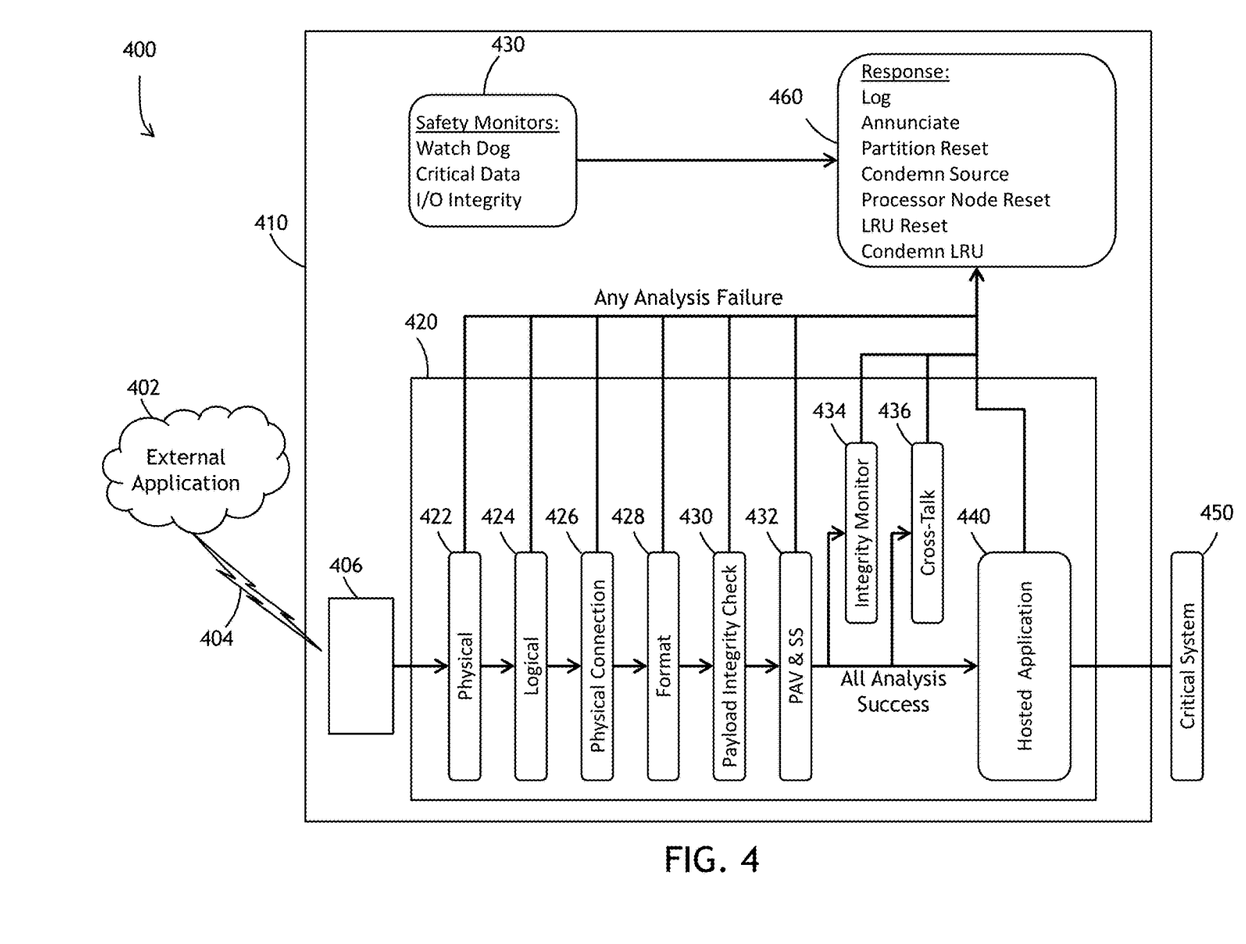
FIG. 4 is a block diagram of a system for network security exemplary of an embodiment of the present invention.

Referring to FIG. 4, a block diagram of a system for network security exemplary of an embodiment of the present invention is shown. System 400 may prevent external application 402 access to critical system 450 via hosted application 440 using the layers of system level checks 420 within LRU 410.

In one embodiment of the present invention, system 400 may receive a pre-defined parameter where the pre-defined parameter is associated with a trusted source and a destination. In this manner, system 400 may anticipate a transmission including at least one data message from an external source for network connection to a destination critical system. System 400 may determine if the external source is a trusted source or an untrusted source.

System Level Checks

System 400 may require each LRU 410 to have an assigned pre-defined parameter (e.g., a predetermined parameter associated with the source) which may eliminate a need for network discovery. This point to point parameter may preclude any plug and play options available to an external application. Further system 400 may enumerate a predefined interface definition for all ports and messages to be carried on the network. Within this structure, system 400 may only allow access to trusted sources, accessing the network through trusted ports, to the critical information. Should a source, labeled as untrusted by any of the layers of system level checks 420, attempt access to hosted application 440 through the network, system 400 may disallow the connection and proceed to enable a response action 460.

External application 402 may attempt authorized or unauthorized contact with LRU 410 via external signal 404 and interface 406. Within each LRU 410, system 400 may employ system level checks 420 to determine the authenticity of the external signal 404. A first parameter system 400 may analyze is a physical source 422. In one embodiment, source and destination MAC valid check at physical source 422 may determine whether a source MAC and a destination MAC are in compliance with one predetermined parameter and are thus, valid for the desired operation. In this manner, system 400 may analyze the hardware of the device used for the transmission via external signal 404. Should the transmission originate from untrusted hardware, system 400 will disallow the request.

A next system level check may include a logical source 424 for the request for access. In one embodiment, a check of source and destination IP validity at logical layer source 424 may determine whether the source and destination IP address comply with a predetermined parameter and thus, are valid and trusted for the desired operation.

A next system level check may include a physical connection 426 of the transmission via external signal 404. In one embodiment, a valid or expected port may fulfill the physical connection 426 analysis. In one embodiment, system check 426 may analyze a port number in access point 406 used by the external application 402.

A next system level check may include a format analysis 428 of the transmission. In a preferred embodiment, a valid or expected data type of the data message may fulfill the format analysis 428. For example, the data message from the external application 402 attempting access to the hosted application 440 must meet the predefined format parameter to survive the analysis 428. One format analysis 428 may be general in nature while another format analysis 428 may be quite specific. Some non-limiting examples of valid formats subject to analysis 428 may include a Binary format, a Floating Point format, Streaming Video, an Aeronautical Radio, Incorporated (ARINC) standard 661 format, an Encapsulated ARINC 429 format, Encapsulated FMS format and the like. The predefined format parameter may include any predefined word definitions including specific words located within the data stream at a specific location in the data stream. Each transmission from external application 402 may possess a well-defined payload structure subject to format analysis 428 before system 400 may grant access to hosted application 440.

A next system level check may include a payload integrity analysis 430 of the transmission. In one embodiment, the payload integrity analysis 430 may include a pre-defined integrity parameter included within the data message associated with the transmission. For example, one embodiment may include a mathematical analysis of the integrity of the payload to determine message validity. One exemplary payload integrity analysis 430 may include a Cyclic Redundancy Check (CRC) analysis of the data message. An additional exemplary payload integrity analysis 430 may include a hidden key parameter associated with CRC calculation within the data message. In this manner, source and destination may agree, in advance, on the data message parameters before the message is received. Thereby enumerating the parameters for system 400 analysis to allow access.

A step 432, system 400 may analyze a validity of an application level 432 of the transmission. In one embodiment, system 400 may analyze at least one abstraction layer of a networked communications system. One abstraction layer may include a Presence and Validity (PAV) check while another abstraction layer may include a source selection of the transmission. One abstraction layer may be standardized by an international standard such as an Open Systems Interconnection (OSI) model comprising a plurality of layers defined by function.

Within secure systems including avionics secure systems, more than one source of data may be employed to accomplish the task of the hosted application 440. For example, in an avionics embodiment, a left static port may provide one input to the air data computer while a right static port may provide a second input. The application level analysis 432 may determine that the multiple sources are both available and valid for system input.

A source selection analysis of application level analysis 432 may include a set of rules for which of the sources may be selected by hosted application 440 for use. For example, should hosted application be an altitude function, the left static sensor, the right static sensor, or a median value of each may be selected for input to the hosted application 440. Further, the application level analysis 432 may aid to prevent a single entity external application 402 from corrupting critical system 450 since external application 402 may not possess the parameter associated with the left or right static sensor.

In addition, step 432 application level analysis may include a time parameter agreed upon before system 400 may allow connectivity. For example, system 400 may enable the at least one pre-defined parameter to include a specific time parameter at which a window of connectivity may open and close. Access attempts outside this exemplary time window may be ignored.

In addition, a cross correlation of multiple instances of the same data message may be required to fulfill the application level analysis 432. For example, in a fire control scenario, a number of instances of the resultant parameter may be required before system 400 determines analysis success and grants access to the critical system 450.

After step 432, system 400 has determining that the unknown source is a trusted source based on each step in the analysis process. System 400 may determine the transmission from the external application a success and validly allowed the data message to reach the hosted application 440. In addition to allowing access, system 400 may continue analysis of the external application through a second integrity monitor 434 and a cross talk monitor 436.

The second integrity monitor 434 may independently verify the integrity of the data message. System 400 may employ second integrity monitor 434 to independently determine an agreement/disagreement with the payload integrity analysis 430. Second integrity monitor 434 may analyze resultant parameters from independent applications as well as analyzing resultant parameter compared with expected parameters. Should the results substantially agree, second integrity monitor 434 may continue monitoring operation. Should the results substantially disagree, second integrity monitor may independently trigger one of the responses 460. Through independent analysis, second integrity monitor 434 may verify an end to end reasonableness of the data messages associated with the external application.

An additional message data monitor may include a common parameter monitoring 436 associated with the hosted application 440 and a second instance of the hosted application. One example of a common parameter monitor 436 may include a cross-talk monitor of a resultant parameter associated with each instance of the hosted application. For example, if one instance of hosted application 440 was breached by an untrusted external application 402, additional instances of hosted application 440 may produce a more reasonable resultant parameter and become the selected resultant parameter for application further use.

The hosted application 440 may possess one level of internal monitoring in addition to the system level checks described herein. Such additional monitoring internal to hosted application may build upon the level of security found within system 400. For example, a hosted application 440 application specific encryption routine may determine validity of each data message associated with external application.

Safety Monitors

Integrity of critical systems may be of extreme importance as discussed above. To adversely affect a critical system, a potential threat need not only provide false data discovered by system level checks 420. A threat may provide a data message intended to overcome the hosted application with volume and prevent the application from proper function. System 400 may enable additional safety monitors 430 to prevent such adverse effect. One example of safety monitor 430 may include a watch dog monitor continuously determining a proper function of the hosted application. Should the watch dog monitor fail to determine proper function, system 400 may enable the watch dog to trigger one of the response actions 460. A preferred response action in this case may be a LRU Reset, with the appropriate system level impacts to alert an operator to the action.

Responses

Once system 400 determines a transmission from the external application to critical system 450 has failed at least one of the steps of analysis, system 400 may provide an appropriate response based on the level of the failure. In one response option, a Log entry may be appropriate, an annunciation may be appropriate in another option. Response actions may further include a reset of a partition, a source condemnation, a processor node reset, a LRU reset and a condemnation of the LRU. Each response action may be tailored to the nature of the intrusion and the nature and sensitivity of the networked critical system.

Figure 5:
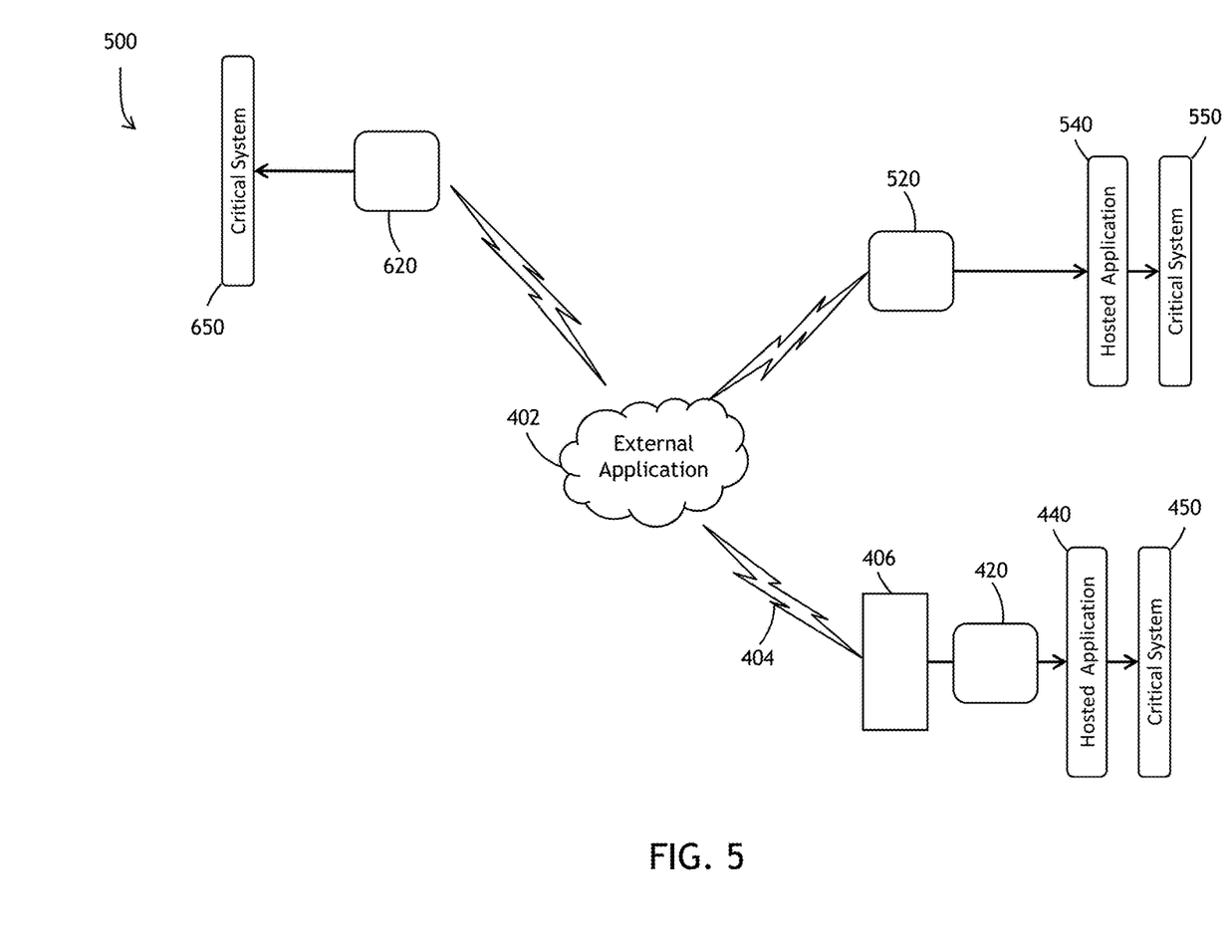
FIG. 5 is a block diagram of a system for network security exemplary of an embodiment of the present invention.

Referring to FIG. 5, a block diagram of a system for network security exemplary of an embodiment of the present invention is shown. Additional networked critical systems 450, 550, 650 may have limited accessibility from external application 402. In one embodiment, critical system 550 may be protected by system level checks 520 and hosted application 540. In additional embodiments, critical system 650 may maintain protection from external application 402 through system level checks 620.

Additional embodiments of the present invention may be incorporated within any network requiring security from a critical system. For example, a fire control network onboard a guided missile cruiser may desire COTS elements which may only access critical systems via an inline embodiment of the present invention.

Additionally a banking environment including access to critical closed network system may function with embodiments herein coupled. A user may access the critical banking system via the COTS elements only if the user meets all criteria of the system level checks 420.

Figure 6:
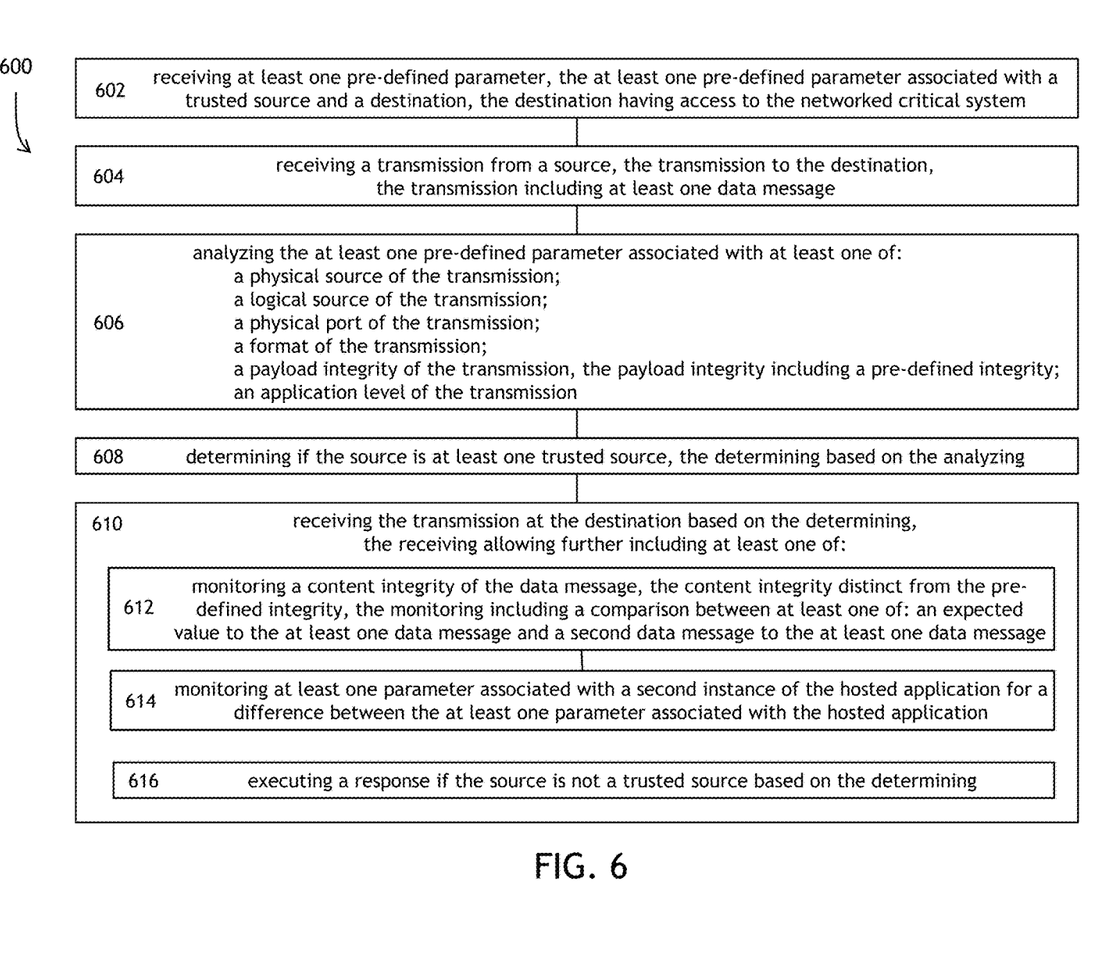
FIG. 6 is a flowchart for a method for network security in avionics systems in accordance with one embodiment of the present invention.

Referring to FIG. 6, a flowchart for a method for network security in avionics systems in accordance with one embodiment of the present invention is shown. Method 600 may begin with step 602, with receiving at least one pre-defined parameter, the at least one pre-defined parameter associated with a trusted source and a destination, the destination having access to the networked critical system; and at step 604, receiving a transmission from a source, the transmission to the destination, the transmission including at least one data message; and at step 606, analyzing the at least one pre-defined parameter associated with at least one of: a physical source of the transmission; a logical source of the transmission; a physical port of the transmission; a format of the transmission; a payload integrity of the transmission, the payload integrity including a pre-defined integrity; and an application level of the transmission. Method 600 continues at step 608, with determining if the source is at least one trusted source, the determining based on the analyzing; and at step 610, receiving the transmission at the destination based on the determining, the receiving allowing further including at least one of: monitoring, at step 612, a content integrity of the data message, the content integrity distinct from the pre-defined integrity, the monitoring including a comparison between at least one of: an expected value to the at least one data message and a second data message to the at least one data message; and monitoring, at step 614, at least one parameter associated with a second instance of the hosted application for a difference between the at least one parameter associated with the hosted application; and at step 616 method 600 may execute a response if the source is not a trusted source based on the determining.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a"

and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for managing network security, comprising:
predefining a plurality of parameters including a first pre-defined parameter and a second pre-defined parameter, the first pre-defined parameter matching a trusted source with a destination within a networked system, the second pre-defined parameter associated with a definition of a network interface to form one or more architectural constraints on communicating with the networked system or the destination via the network interface;
receiving, by a receiver, a transmission from a source when a parameter associated with the source matches the first pre-defined parameter, the transmission comprising a data message and a transmission parameter from the source, the transmission parameter addressing the data message to the destination within the networked system;
determining, by a processor in communication with the receiver, if the source is trusted and is communicating in accordance with the one or more architectural constraints by comparing the second pre-defined parameter with the transmission parameter;
receiving, by the receiver, the transmission if the source is trusted based on the determining;
monitoring, by the processor, an integrity of the data message upon determination of the source being trusted, the integrity of the data message being monitored at least according to a content value of the data message; and
executing, by the processor, a response action based on the determining indicating the source is not trusted or executing the response action based on the monitoring revealing an improper content value, wherein predefining a plurality of parameters including a first pre-defined parameter and a second pre-defined parameter, the first pre-defined parameter matching a trusted source with a destination within a networked system further comprises:
filtering, by the processor, the transmission based on at least one of: source MAC address and source Internet Protocol (IP) address, and wherein comparing the second of pre-defined parameter with a transmission parameter further comprises: filtering, by the processor, the transmission based on an architectural constraint of the destination, the architectural constraint comprises a destination data queue having a combination of: destination user datagram protocol (UDP) port number, destination IP address, source IP address, and physical port.

2. The method of claim 1, wherein the second pre-defined parameter comprises at least a third parameter, and the transmission parameter further comprises a combination of at least two of a physical connection parameter, an application parameter, and a format parameter.

3. The method of claim 1, wherein the data message comprises a first data message, wherein the architectural constraint comprises a respective destination port of a plurality of destination ports and a MAC or IP address limited to the respective destination port, wherein the content value comprises a result of comparing an expected value to the first data message or comparing a second data message to the first data message, and wherein the improper content value comprises a disagreement, respectively, between a result of a first payload integrity analysis and a result of a second payload integrity analysis, the expected value and the first data message, or the second data message and the first data message.

4. The method of claim 1, further comprising:
receiving the plurality of pre-defined parameters from a known trusted source, wherein the plurality of pre-defined parameters are associated with an identification of the known trusted source and an identification of the destination as associated with the known trusted source, and wherein the known trusted source comprises a known trusted line replaceable unit (LRU).

5. The method of claim 1, further comprising:
commanding at least one safety monitor to enable executing the response action.

6. The method of claim 1, further comprising:
disallowing the transmission based on the filtering or executing the response action based on the filtering, wherein the response action comprises at least one of: a log entry, an annunciation, a partition reset, a source condemnation, a processor node reset, a Line Replaceable Unit (LRU) reset, and a LRU condemnation.

7. The method of claim 2, wherein comparing the second pre-defined parameter with the transmission parameter further comprises assigning a plurality of validity values to the second plurality of parameters and comparing the plurality of validity values to the plurality of pre-defined parameters.

8. The method of claim 1, wherein the transmission parameter further comprises two or more parameters associated with at least two of: a physical connection associated with the transmission, a physical port of the transmission, a format of the transmission, and an application level of the transmission.

9. The method of claim 8, wherein a parameter of the two or more parameters comprises the application level of the transmission, and wherein comparing the second pre-defined parameter with the transmission parameter further comprises a comparison of a known trusted source application with a source application associated with one of: a source Internet Protocol (IP) address and a source User Datagram Protocol (UDP) address.

10. The method of claim 8, wherein a parameter of the two or more parameters comprises the application level of the transmission, and wherein comparing the second pre-defined parameter with the transmission parameter further comprises a comparison of a known trusted source application with a source application associated with at least one of: a result of a presence and validity (PAV) check and a number or type of sources supplying data to the source application.

11. A method for managing network security, comprising:
predefining a plurality of parameters including a first pre-defined parameter and a second pre-defined parameter, the first pre-defined parameter matching a trusted source with a destination within a networked system, the second pre-defined parameter associated with a definition of a network interface to form one or more architectural constraints on communicating with the networked system or the destination via the network interface;
receiving, by a receiver, a transmission from a source when a parameter associated with the source matches the first pre-defined parameter, the transmission comprising a data message and a transmission parameter from the source, the transmission parameter addressing the data message to the destination within the networked system;
determining, by a processor in communication with the receiver, if the source is trusted and is communicating in accordance with the one or more architectural constraints by comparing the second pre-defined parameter with the transmission parameter;
receiving, by the receiver, the transmission if the source is trusted based on the determining;
monitoring, by the processor, an integrity of the data message upon determination of the source being trusted, the integrity of the data message being monitored at least according to a content value of the data message; and
executing, by the processor, a response action based on the determining indicating the source is not trusted or executing the response action based on the monitoring revealing an improper content value, wherein predefining a plurality of parameters including a first pre-defined parameter and a second pre-defined parameter, the first pre-defined parameter matching a trusted source with a destination within a networked system further comprises:
filtering, by the processor, the transmission based on at least one of: source MAC address and source Internet Protocol (IP) address, and wherein comparing the second of pre-defined parameter with a transmission parameter further comprises:
filtering, by the processor, the transmission based on an architectural constraint of the destination, wherein the data message comprises a first data message, wherein the architectural constraint comprises a respective destination port of a plurality of destination ports and a MAC or IP address limited to the respective destination port, wherein the content value comprises a result of comparing an expected value to the first data message or comparing a second data message to the first data message, and wherein the improper content value comprises a disagreement, respectively, between a result of a first payload integrity analysis and a result of a second payload integrity analysis, the expected value and the first data message, or the second data message and the first data message.

12. A method for managing network security, comprising:
predefining a plurality of parameters including a first pre-defined parameter and a second pre-defined parameter, the first pre-defined parameter matching a trusted source with a destination within a networked system, the second pre-defined parameter associated with a definition of a network interface to form one or more architectural constraints on communicating with the networked system or the destination via the network interface;
receiving, by a receiver, a transmission from a source when a parameter associated with the source matches the first pre-defined parameter, the transmission comprising a data message and a transmission parameter from the source, the transmission parameter addressing the data message to the destination within the networked system;
determining, by a processor in communication with the receiver, if the source is trusted and is communicating in accordance with the one or more architectural constraints by comparing the second pre-defined parameter with the transmission parameter;
receiving, by the receiver, the transmission if the source is trusted based on the determining;
monitoring, by the processor, an integrity of the data message upon determination of the source being trusted, the integrity of the data message being monitored at least according to a content value of the data message; and
executing, by the processor, a response action based on the determining indicating the source is not trusted or executing the response action based on the monitoring revealing an improper content value, wherein the second pre-defined parameter comprises at least a third parameter, and the transmission parameter further comprises a combination of at least two of a physical connection parameter, an application parameter, and a format parameter, the comparing the second pre-defined parameter with the transmission parameter further comprises assigning a plurality of validity values to the second plurality of parameters and comparing the plurality of validity values to the plurality of pre-defined parameters.

13. A method for managing network security, comprising:
predefining a plurality of parameters including a first pre-defined parameter and a second pre-defined parameter, the first pre-defined parameter matching a trusted source with a destination within a networked system, the second pre-defined parameter associated with a definition of a network interface to form one or more architectural constraints on communicating with the networked system or the destination via the network interface;

receiving, by a receiver, a transmission from a source when a parameter associated with the source matches the first pre-defined parameter, the transmission comprising a data message and a transmission parameter from the source, the transmission parameter addressing the data message to the destination within the networked system;

determining, by a processor in communication with the receiver, if the source is trusted and is communicating in accordance with the one or more architectural constraints by comparing the second pre-defined parameter with the transmission parameter;

receiving, by the receiver, the transmission if the source is trusted based on the determining;

monitoring, by the processor, an integrity of the data message upon determination of the source being trusted, the integrity of the data message being monitored at least according to a content value of the data message; and executing, by the processor, a response action based on the determining indicating the source is not trusted or executing the response action based on the monitoring revealing an improper content value, wherein the transmission parameter further comprises two or more parameters associated with at least two of: a physical connection associated with the transmission, a physical port of the transmission, a format of the transmission, and an application level of the transmission, wherein a parameter of the two or more parameters comprises the application level of the transmission, and wherein comparing the second pre-defined parameter with the transmission parameter further comprises a comparison of a known trusted source application with a source application associated with one of: a source Internet Protocol (IP) address and a source User Datagram Protocol (UDP) address.

* * * * *